(12) United States Patent
Hsu

(10) Patent No.: US 9,759,242 B2
(45) Date of Patent: Sep. 12, 2017

(54) HINGE DEVICE

(71) Applicant: JARLLYTEC CO., LTD., New Taipei (TW)

(72) Inventor: Yu-Tsun Hsu, New Taipei (TW)

(73) Assignee: JARLLYTEC CO., LTD., New Taipei (TW)

(*) Notice: Subject to any disclaimer, the term of this patent is extended or adjusted under 35 U.S.C. 154(b) by 288 days.

(21) Appl. No.: 14/669,264

(22) Filed: Mar. 26, 2015

(65) Prior Publication Data

US 2016/0097227 A1     Apr. 7, 2016

(30) Foreign Application Priority Data

Oct. 6, 2014   (TW) .............................. 103217796 U

(51) Int. Cl.
| | | |
|---|---|---|
| *E05D 7/00* | (2006.01) | |
| *F16B 1/00* | (2006.01) | |
| *G06F 1/16* | (2006.01) | |
| *F16M 11/10* | (2006.01) | |
| *F16M 13/00* | (2006.01) | |

(52) U.S. Cl.
CPC ............... *F16B 1/00* (2013.01); *F16M 11/10* (2013.01); *F16M 13/005* (2013.01); *G06F 1/16* (2013.01); *F16B 2001/0035* (2013.01)

(58) Field of Classification Search
CPC ......... F16B 1/00; F16M 11/10; F16M 13/005; Y10T 16/542; Y10T 16/543; Y10T 16/544; E05D 11/082; E05D 11/06
See application file for complete search history.

(56) References Cited

U.S. PATENT DOCUMENTS

| | | | | |
|---|---|---|---|---|
| 3,027,592 | A * | 4/1962 | Schnur ...................... | E05D 1/04 |
| | | | | 16/355 |
| 7,527,166 | B2 * | 5/2009 | Kondo ..................... | B60R 11/00 |
| | | | | 220/825 |
| 8,978,206 | B2 * | 3/2015 | Hsu .......................... | F16H 19/08 |
| | | | | 16/227 |
| 9,244,496 | B2 * | 1/2016 | Sharma .................. | G06F 1/1654 |
| 9,304,549 | B2 * | 4/2016 | Siddiqui ................... | E05D 7/00 |
| 9,404,298 | B1 * | 8/2016 | Chen ...................... | G06F 1/1681 |
| 9,518,414 | B1 * | 12/2016 | Chen ...................... | G06F 1/1681 |
| 2009/0070961 | A1 * | 3/2009 | Chung .................... | E05D 3/122 |
| | | | | 16/354 |

(Continued)

*Primary Examiner* — Victor Batson
*Assistant Examiner* — Matthew Sullivan
(74) *Attorney, Agent, or Firm* — Guice Patents PLLC

(57) ABSTRACT

A hinge device includes two rotation units and a base capable of relatively rotating; one radial side of the base is formed with an arc-shaped recess in which an axial connection part is formed, one axial side of the arc-shaped recess is formed with an action space; the rotation units are respectively disposed in the action space and the arc-shaped recess, and axial sides thereof are respectively formed a first axial connection part and a second axial connection part and an arc-shaped structure and an arc-shaped channel, each axial connection part is connected to each other for allowing the rotation units to respectively move along the action space and the arc-shaped recess for being rotated in or out of the base; the rotation units can only be in contact at the axial side for forming a sequentially rotating status but also at a radial lateral circumference for synchronously rotating.

21 Claims, 15 Drawing Sheets

(56) References Cited

U.S. PATENT DOCUMENTS

2009/0083943 A1* 4/2009 Chen .................... G06F 1/1681
16/342
2014/0167585 A1* 6/2014 Kuan ................... E05D 7/0045
312/326
2017/0003719 A1* 1/2017 Siddiqui .................. E05D 1/04

* cited by examiner

HINGE DEVICE

BACKGROUND OF THE INVENTION

1. Field of the Invention

The present invention relates to hinge device, especially to a hinge device installed between a display and a supporter; the above-mentioned display can be a tablet computer or an AIO (all in one) computer, and the tablet computer can be the touch screen of a smart phone or a notebook computer; and the above-mentioned supporter can be a plate-like member, a sheet-like member or a frame-like member.

2. Description of Related Art

A display such as a tablet computer (or AIO computer) utilizes a pivotally-connected supporter for supporting the tablet computer to stand, and the supporter utilizes a hinge device for achieving an rotating effect for the purpose of folding and unfolding and supporting the tablet computer to stand, the above-mentioned hinge device includes a core shaft and a friction plate sleeved with the core shaft, an elastic plate or a spring, a screw nut and etc., wherein the main components for achieving the rotating effect is the core shaft, one end of the core shaft is pivotally installed at the portion of the supporter defined at the rotation center line, the other end thereof is pivotally connected to a wall surface of the tablet computer thereby enabling the supporter to rotate relative to the tablet computer; if an obvious torque varying effect and a positioning effect are desired to be generated, the core shaft of the hinge device is further installed with two interfering members (a.k.a. cams) capable of mutually pushing or being engaged; thus, the hinge device is the main component for enabling the tablet computer to be easily switched from a horizontal status to a vertical status. Moreover, the supporter may be further provided with an effect of standing in multiple angles, so after the supporter is unfolded, the tablet computer is enabled to be stably positioned in the above-mentioned standing angles.

SUMMARY OF THE INVENTION

However, the conventional hinge device or the hinge device capable of providing multiple standing angles both limit the unfolding angle of the supporter, so the unfolding angle defined between the supporter and the tablet computer is often smaller than 90 degrees and difficult to be greater than 90 degrees, so the tablet computer is only allowed to stand with a small inclined angle and not provided with a larger angle for being further rotated to have a greater inclined status; moreover, the above-mentioned hinge device is mainly designed for providing a positioning effect, so the unfolding angle of the supporter can only be positioned at a preset angle, and no freely immobilizing effect is provided; as such, how to enable the hinge device to allow the supporter to be rotated more than 90 degrees relative to the display such as the tablet computer and also to provide an freely immobilizing effect and allow the supporter to be folded for being adjacent to the wall surface of the tablet computer are the improvements that the present invention wants to achieve.

For improving the above-mentioned shortages, one primary objective of the present invention is to provide a hinge device which is applicable in a supporter of a display such as a tablet computer (or AIO computer), the hinge device utilizes two rotation units capable of working with each other and respectively formed with an arc-shaped structure and an arc-shaped channel which are not coaxially arranged with the rotation center line, so the two rotation units are able to in mutual contact at the axial side and provided with an effect of sequentially rotating in stages, thereby enabling a rotation mechanism composed by the two rotation units to be used for replacing the conventional core shaft, and two accommodation parts of a base are provided, so the two rotation units are able to be sequentially rotated out of the base for providing an extending effect, and the status of the whole rotation mechanism is very similar to a hollow core shaft, thereby enabling the connected supporter to be rotated and unfolded greater than 90 degrees relative to the tablet computer or to be sequentially rotated into the base for being hidden in the base, so the connected supporter is able to be folded for being flatly adjacent to the wall surface of the tablet computer.

Another objective of the present invention is to provides a hinge device having a synchronously rotating function, in which a base formed with an arc-shaped recess and an action space works with a rotation mechanism; the rotation mechanism includes two rotation units contacting each other via a radial lateral circumference, wherein one of the rotation units is formed with an arc-shaped structure and the other rotation unit is installed with a conventional core shaft, the rotation center line is defined at the center of the arc-shaped structure so as to be used for replacing the conventional core shaft; on the other hand, a third rotation unit capable of being hidden in the base can be additionally installed between the two rotation units of the rotation mechanism, so the third rotation unit and either of the original rotation units can be in contact with each other via the radial circumference for achieving the synchronously rotating function, and a plurality of teeth structures capable of being mutually engaged are respectively formed on the radial lateral circumferences of the two rotation units for stabilizing the synchronously rotating effect.

One another objective of the present invention is to provide a hinge device having an freely immobilizing function, in which a torque unit is additionally installed on the above-mentioned base for being connected to an axial core shaft of the third rotation unit or the conventional core shaft of the above-mentioned rotation unit, so an freely immobilizing effect is provided when the connected supporter is rotated.

For achieving said objectives, the present invention provides two embodiments, the first embodiment discloses a hinge device which includes: a base, one radial side thereof is formed with an arc-shaped recess, an axial connection part is formed in the arc-shaped recess, and one axial side of the arc-shaped recess is formed with an action space; and a rotation mechanism which includes a first rotation unit and a second rotation unit which are in contact with each other and respectively disposed in the action space and the arc-shaped recess, one axial side of the first rotation unit is formed with a first axial connection part and an arc-shaped structure surrounding the first axial connection part, one axial side of the second rotation unit is formed with a second axial connection part and an arc-shaped channel surrounding the second axial connection part and engaged with the arc-shaped structure, the arc-shaped structure is able to slide in or out of the arc-shaped channel, and two axial ends of the second axial connection part are respectively connected to the axial connection part and the first axial connection part, thereby enabling the first rotation unit and the second rotation unit to respectively slide along the action space and the arc-shaped recess so as to be respectively rotated in or out of the base, and a relative rotating status is formed between the first rotation unit, the second rotation unit and the base.

For achieving said objectives, the second embodiment of the present invention discloses a hinge device which includes: a base, one radial side thereof is formed with an arc-shaped recess, an axial connection part is formed in the arc-shaped recess, and one axial side of the arc-shaped recess is formed with an action space; and a rotation mechanism which includes a first rotation unit and a third rotation unit which are in mutual contact and both disposed in the action space and contact each other via the radial lateral circumference, one axial side of the first rotation unit is formed with a first axial connection part and an arc-shaped structure surrounding the first axial connection part, the arc-shaped structure is able to slide in or out of the arc-shaped recess, and the first axial connection part is engaged with the axial connection part, thereby enabling the first rotation unit to slide along the action space so as to be rotated in or out of the base, and a relative rotating status is formed between the first rotation unit and the base, and the first rotation unit in the rotating status is able to drive the third rotation unit to synchronously and reversely rotate.

Accordingly, the hinge device of the present invention utilizes two rotation units contacting each other via the axial side or the radial lateral circumference, and adopts the rotation center line is defined at the center of the arc-shaped structure for working with the arc-shaped channel or the arc-shaped recess so as to replace the conventional core shaft, so the composed rotation mechanism is different from the conventional hinge device, and advantages achieved by the present invention are: the rotation mechanism is provided with an effect of rotating in stages for extending out, a synchronously rotating effect and a torque varying effect are provided, so the connected supporter is able to be rotated and unfolded greater than 90 degrees relative to the display such as a tablet computer and an freely immobilizing status is also provided, the whole volume is able to be reduced, a hidden effect is provided so the appearance can be formed as a flat surface, and the convenience in assembly is also provided.

DETAILED DESCRIPTION OF THE PREFERRED EMBODIMENT

Figure 1:
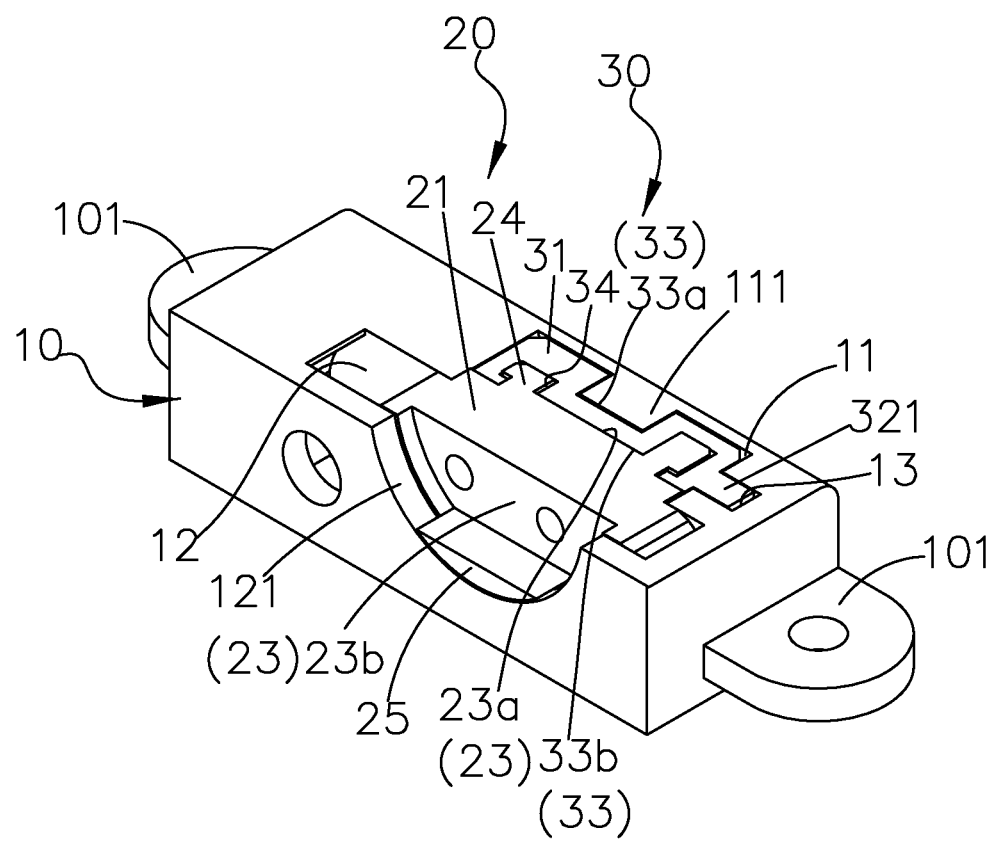
FIG. 1 is a schematic view illustrating the hinge device according to a first embodiment of the present invention.

Referring from FIG. 1 to FIG. 5, the present invention provides a hinge device. According to a first embodiment of the present invention, the hinge device includes a base 10 and a rotation mechanism. One radial side of the base 10 is formed with an arc-shaped recess 11, an axial connection part 111 is formed in the arc-shaped recess 11, and one axial side of the arc-shaped recess 11 is formed with an action space 12. The rotation mechanism includes a first rotation unit 20 and a second rotation unit 30 which are in contact with each other and respectively disposed in the action space 12 and the arc-shaped recess 11. One axial side of the first rotation unit 20 is formed with a first axial connection part 23 and an arc-shaped structure 24 surrounding the first axial connection part 23. One axial side of the second rotation unit 30 is formed with a second axial connection part 33 and an arc-shaped channel 34 surrounding the second axial connection part 33 and engaged with the arc-shaped structure 24. The arc-shaped structure 24 is able to slide in or out of the arc-shaped channel 34. Two axial ends of the second axial connection part 33 are respectively connected to the axial connection part 111 and the first axial connection part 23, thereby enabling the first rotation unit 20 and the second rotation unit 30 to respectively slide along the action space 12 and the arc-shaped recess 11 so as to be rotated in or out of the base 10, and a relative rotating status is formed between the first rotation unit 20, the second rotation unit 30 and the base 10.

Figure 3:
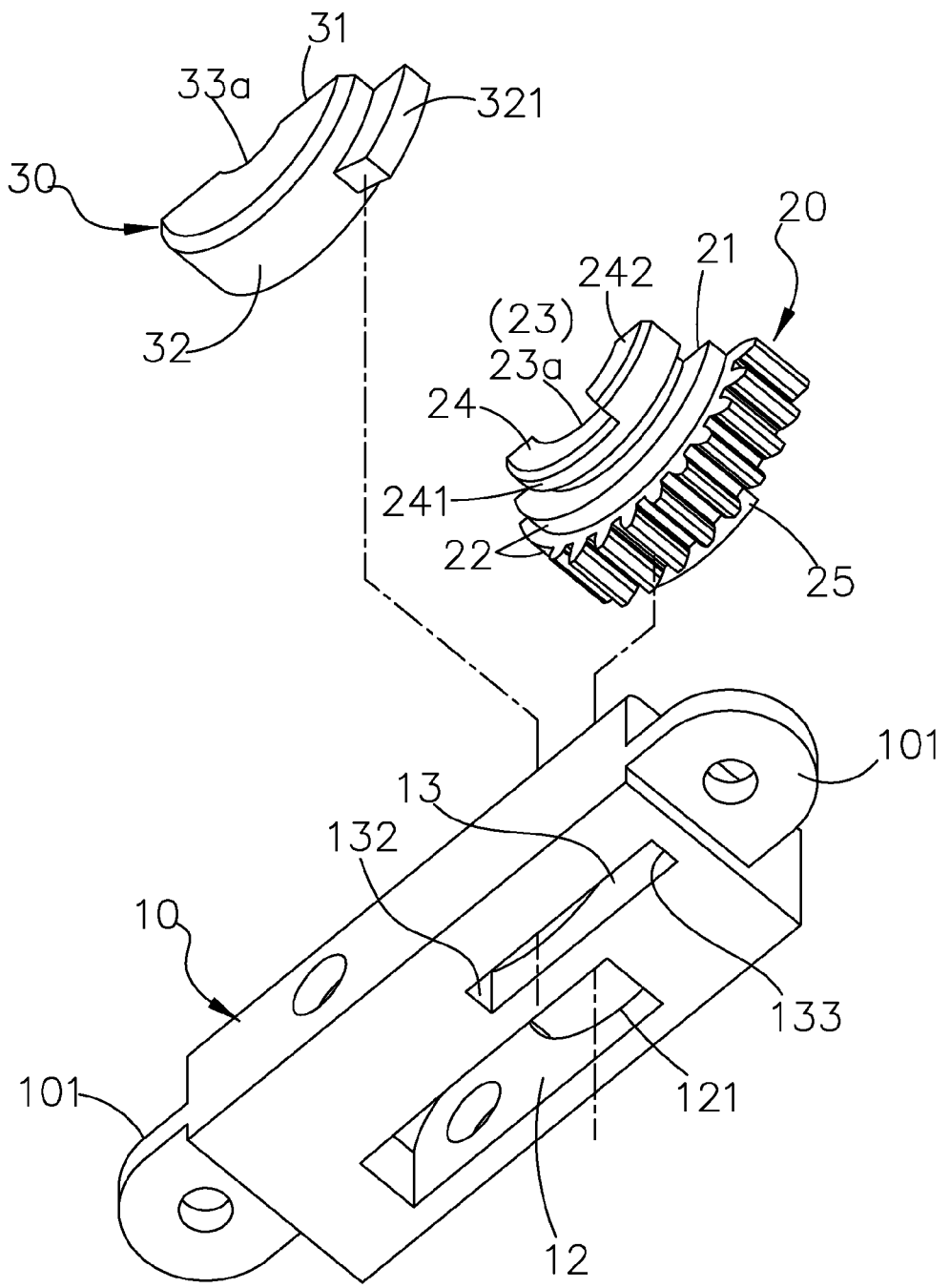
FIG. 3 is an exploded bottom view of FIG. 1.

According to the first embodiment and as shown from FIG. 1 and FIG. 3, the connecting means for the second rotation unit 30 being respectively connected to the first rotation unit 20 and the base 10 is that: the axial connection part 111 of the base 10 is formed with an axial convex part in the arc-shaped recess 11; the first axial connection part 23 is respectively formed with an axial concave part 23a, 23b at two opposite axial sides of the first rotation unit 20; the second axial connection part 33 is respectively formed with an axial concave part 33a and an axial convex part 33b at two opposite axial sides of the second rotation unit 30; so the axial convex part 33b at one axial side of the second rotation unit 30 is able to be engaged with the axial concave part 23a at one axial side of the first rotation unit 20, and the axial convex part (the axial connection part 111) of the base 10 is able to be engaged with the axial concave part 33a at the opposite axial side of the second rotation unit 30, thereby enabling the two rotation units and the base to relatively rotate; what shall be addressed is that the scope of the present invention is not limited by the concave and convex status of each above-mentioned axial connection part.

Figure 2:
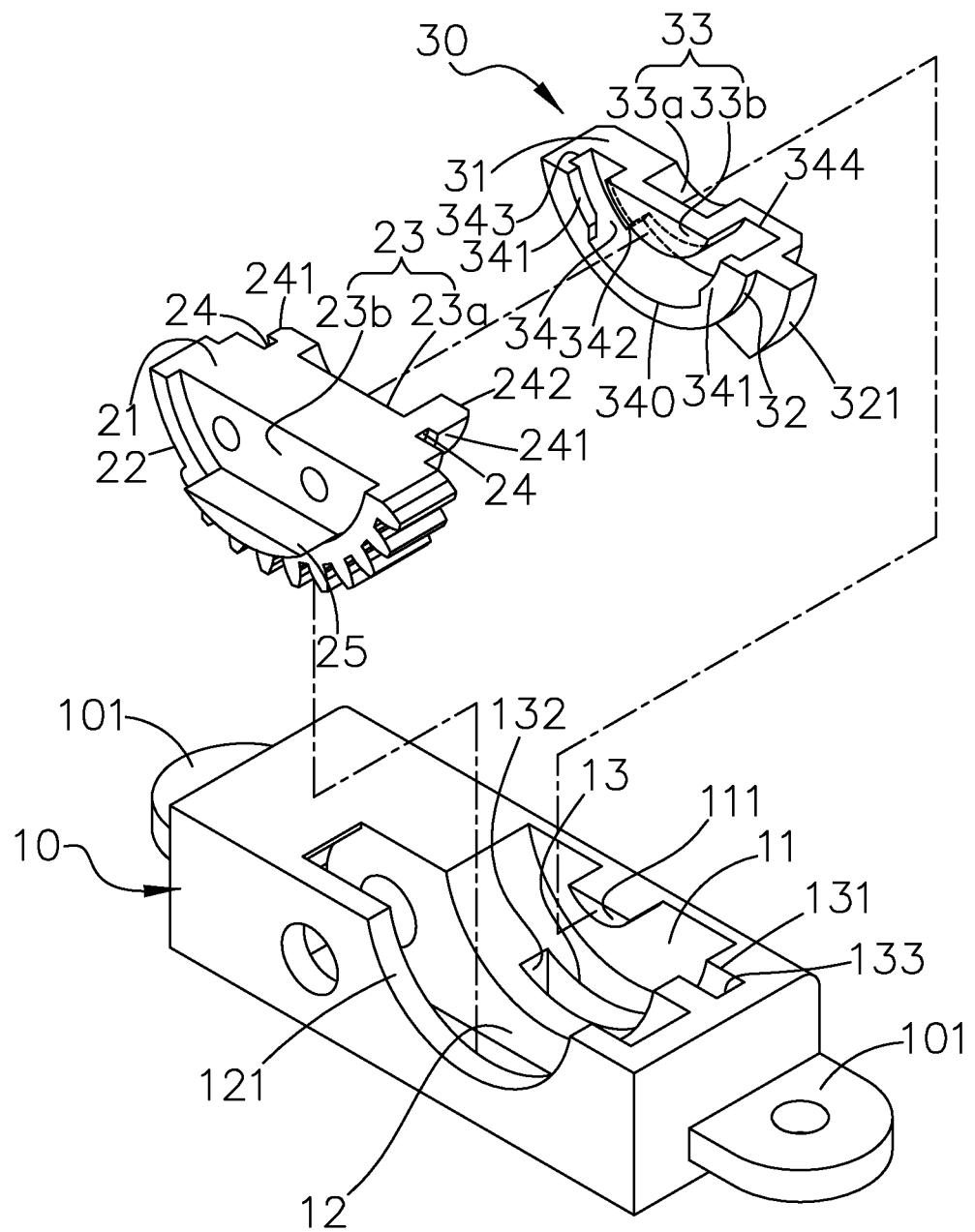
FIG. 2 is an exploded top view of FIG. 1.

In addition, with the arc-shaped structure 24 working with the arc-shaped channel 34, the rotating effect of the two engaged rotation units is provided with a guiding function. As shown in FIG. 2 and FIG. 3, the arc-shaped channel 34 (axial direction) is concavely formed at one axial side of the second rotation unit 30 so as to be installed along the periphery of the axial convex part 33b, and an arc-shaped opening 340 is formed at the axial side, and one radial side of the second rotation unit 30 is formed with at least one channel opening 343, 344. The arc-shaped structure 24 (axial direction) is protrudingly formed at one axial side of the first rotation unit 20 and corresponding to the shape of the arc-shaped channel 34 so as to be installed along the periphery of the axial concave part 23a, thereby allowing the first rotation unit 20 and the second rotation unit 30 to be in corresponding contact at the above-mentioned axial side, and the arc-shaped structure 24 is able to be correspondingly engaged with the arc-shaped channel 34 and able to enter or leave through the at least one channel opening 343, 344. According to the present invention, to stabilize the relative rotating motion of the first rotation unit 20 and the second rotation unit 30 in mutual contact for preventing from being loosened, the edge of the arc-shaped opening 340 is formed with at least one radial block wall 341, and at least one radial flange 241 is formed along the edge of the arc-shaped structure 24, so the arc-shaped structure 24 and the arc-shaped channel 34 are enabled to be mutually buckled thereby preventing from being loosened at the axial side, and the arc-shaped structure 24 is able to stably slide along the arc-shaped channel 34.

Figure 11:
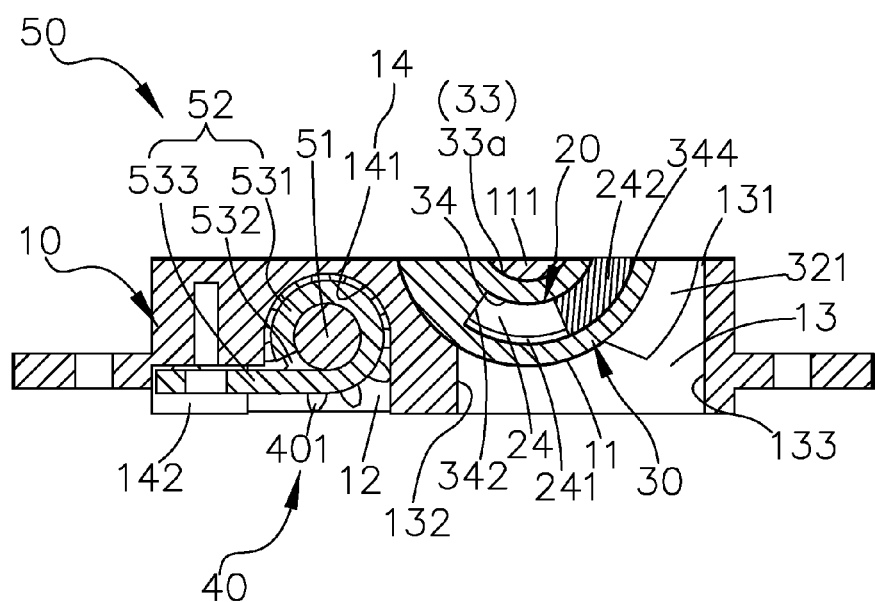
FIG. 11 is a cross sectional view of FIG. 10 taken along A-A.
Figure 12:
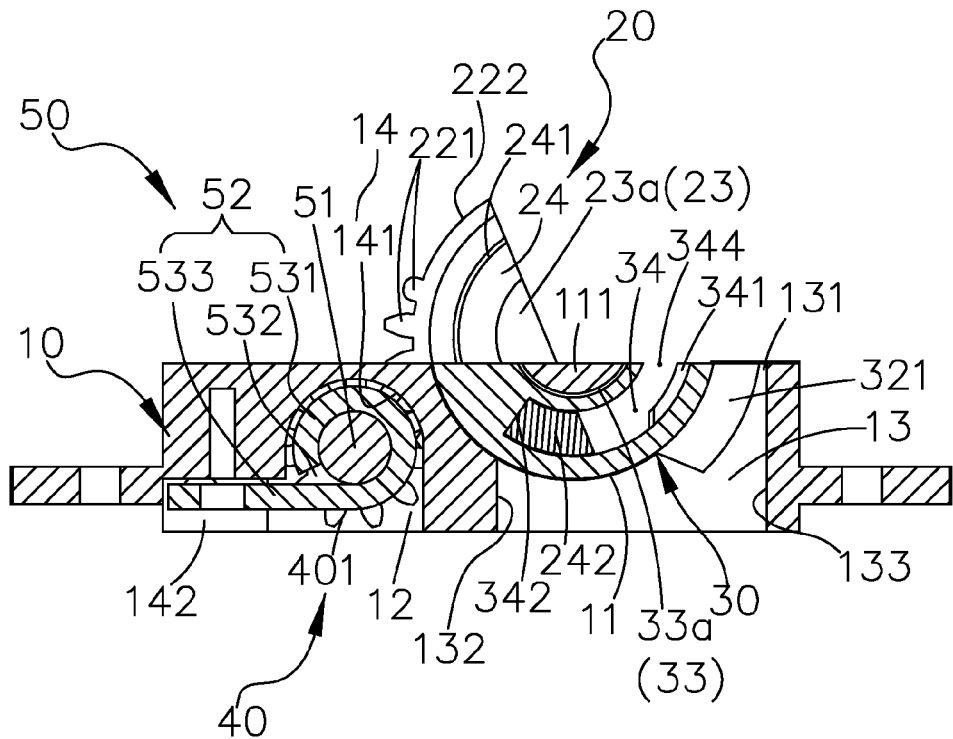
FIG. 12 is a schematic view illustrating the operational status after the operation shown in FIG. 11.
Figure 13:
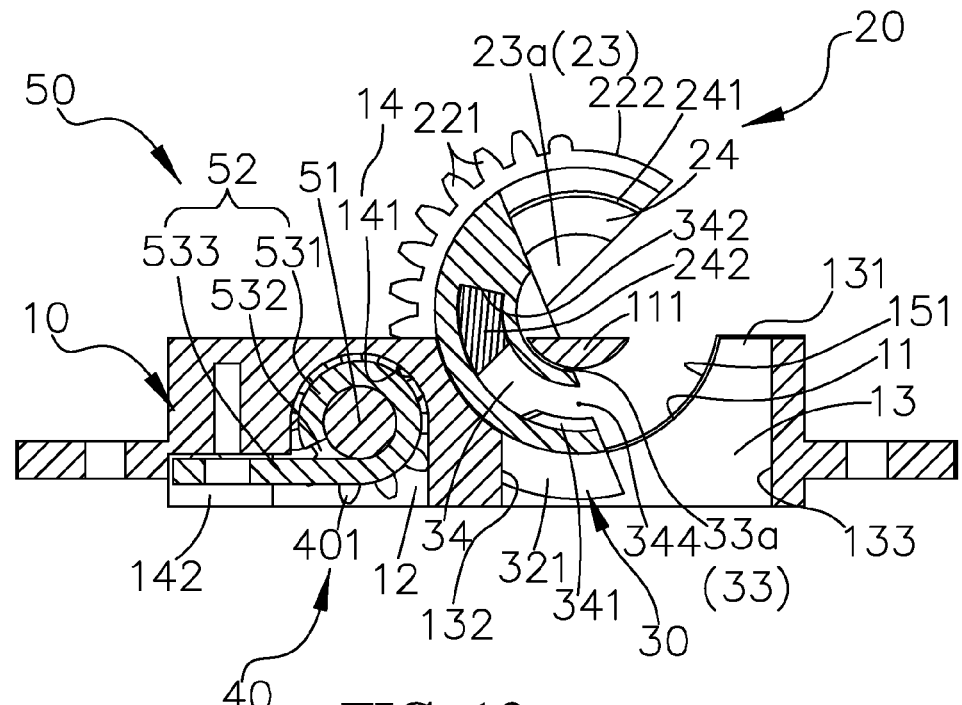
FIG. 13 is a schematic view illustrating the operational status after the operation shown in FIG. 12.

For enabling the first rotation unit 20 and the second rotation unit 30 in axial contact to be provided with an effect of rotating out of the base 10 in stages, one end of the arc-shaped channel 34 is gradually shrunk towards the other end thereby forming a stop structure 342 (marked as dashed lines in FIG. 2) on the inner wall of the arc-shaped channel 34, and the outer wall of the arc-shaped structure 24 is formed with a corresponding stop structure 242 (as shown in FIG. 3), the corresponding stop structure 242 is able to slide in the arc-shaped channel 34 and stopped by the stop structure 342, so the first rotation unit 20 or the second rotation unit 30 whichever is firstly rotated out is able to be formed with a lager angle comparing the second rotation unit 30 or the first rotation unit 20 which is subsequently rotated out; in other words, when both of the first rotation unit 20 and the second rotation unit 30 are not rotated out from the base 10, the stop structure 342 in the arc-shaped channel 34 and the corresponding stop structure 242 are in a separating status (as show in FIG. 11), when the first rotation unit 20 is firstly rotated out of the action space 12, the arc-shaped structure 24 is gradually slid out of the arc-shaped channel 34, thereby allowing the corresponding stop structure 242 to be gradually slid towards the stop structure 342 until being in contact for forming a mutual stopping status (as shown in FIG. 12), if the first rotation unit 20 is desired to be further rotated out, the above-mentioned stopping effect is utilized for linking the second rotation unit 30 to be rotated, so in the subsequent rotating process, the first rotation unit 20 and the second rotation unit 30 are enabled to be synchronously rotated for being gradually and respectively rotated out from the action space 12 and the arc-shaped recess 11. Because the first rotation unit 20 has already been rotated out of the base 10 with a certain angle, the second rotation unit 30 which is subsequently rotated out from the base 10 has a smaller rotating angle relative to the base 10 comparing the rotating angle of the first rotation unit 20 (as shown in FIG. 13).

As shown in FIG. 2 and FIG. 3, the base 10 is further formed with a radial penetrated hole 13. The radial penetrated hole 13 penetrates the arc-shaped recess 11 and is formed with a notch 131 at the edge of the arc-shaped recess 11, so two radial hole walls 132, 133 of the radial penetrated hole 13 are located in different locations (as shown in FIG. 2, one of the radial hole walls 132 is located in the radial penetrated hole 13 of the arc-shaped recess 11, and the other radial hole wall 133 is located in the notch 131). The second rotation unit 30 is formed with a second planar surface 31 and a second arc-shaped surface 32 so as to form a radial lateral circumference of the second rotation unit 30, so the contour of the second rotation unit 30 can either be a bow-like member or a semi-circular member when being viewed in the axial direction (as shown in FIG. 11), and a fan-shaped stop block 321 is extended from the radial lateral circumference and capable of being guided for sliding in the radial penetrated hole 13. The fan-shaped stop block 321 is moved with the second rotation unit 30 in a rotating status so as to be in contact with one of the radial hole walls 132 of the radial penetrated hole 13 for forming a stopping status (as shown in FIG. 13), or to enter or leave the radial penetrated hole 13 via the notch 131. As such, the contour of the arc-shaped recess 11 can either be a bow-like recess or a semi-circular recess when being viewed in the axial direction so as to match the shape of the second rotation unit 30, thus the second arc-shaped surface 32 of the second rotation unit 30 is able to fully enter the arc-shaped recess 11 of the base 10 and the second planar surface 31 is able to be aligned with one radial side of the base 10, thereby allowing the second rotation unit 30 to be hidden in the base 10. Wherein, for enabling the second rotation unit 30 to be slid along the arc-shaped recess 11 for being rotated in or out, the second arc-shaped surface 32 is correspondingly matched with the radial arc-shaped bottom surface of the arc-shaped recess 11; as shown in figures, the fan-shaped stop block 321 is extended from the second arc-shaped surface 32, so when the fan-shaped stop block 321 and the radial hole wall 132 are mutually stopped for forming a stopping status, the stopping status is able to define the maximum angle allowing the rotation mechanism to be rotated out relative to the base 10, and the design of enabling the fan-shaped stop block 321 to enter or leave the radial penetrated hole 13 via the notch 131 is for the purpose of being convenient in assembly and disassembly.

Figure 4:
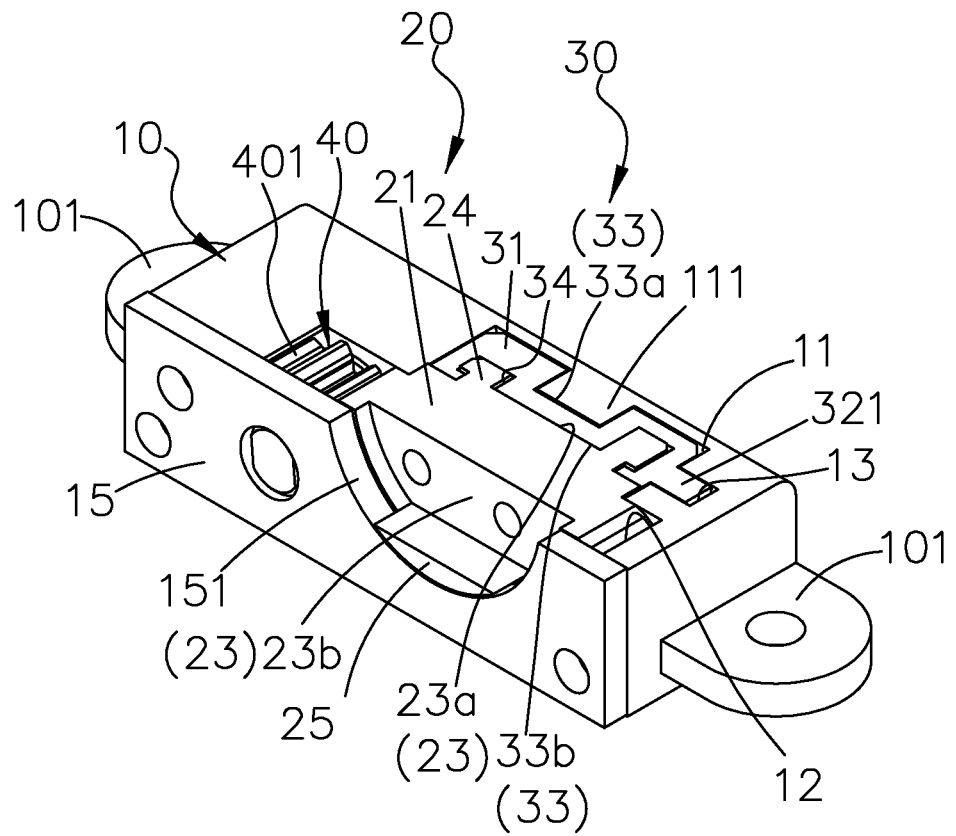
FIG. 4 is a perspective view illustrating the rotation mechanism being additionally installed with a third rotation unit and the base being additionally installed with a lateral plate according to the first embodiment of the present invention.
Figure 5:
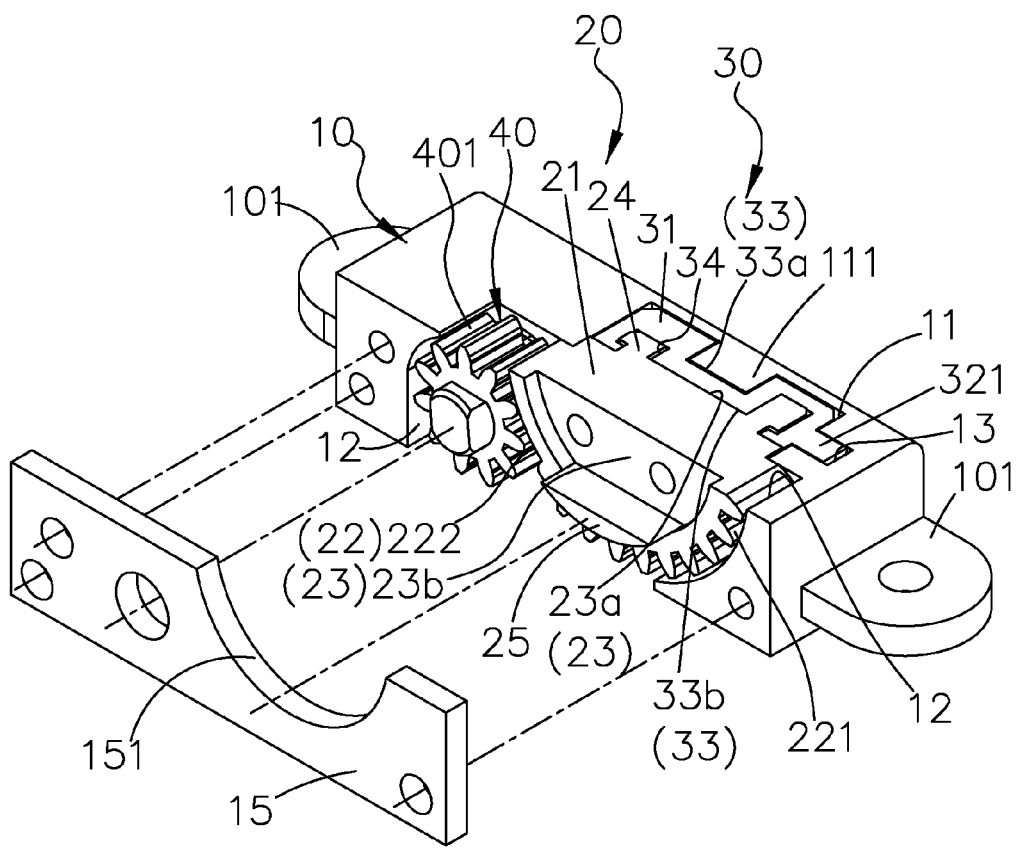
FIG. 5 is a perspective view illustrating the lateral plate being detached from the base.
Figure 8:
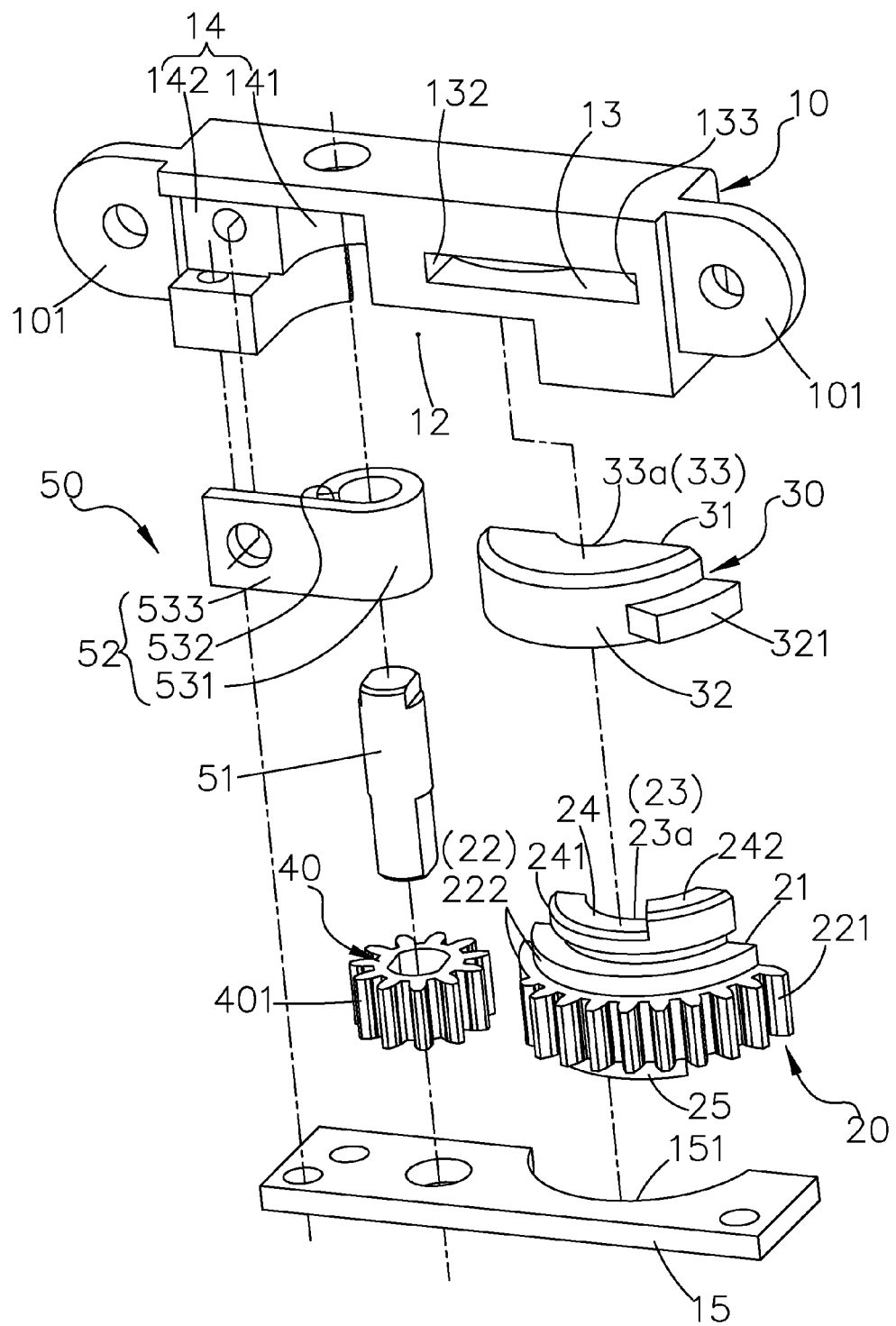
FIG. 8 is a perspective exploded view illustrating the rotation mechanism of the hinge device including a first rotation unit, a second rotation unit, a third rotation unit and a torque unit, and the base being additionally installed with a lateral plate according to the second embodiment of the present invention.
Figure 9:
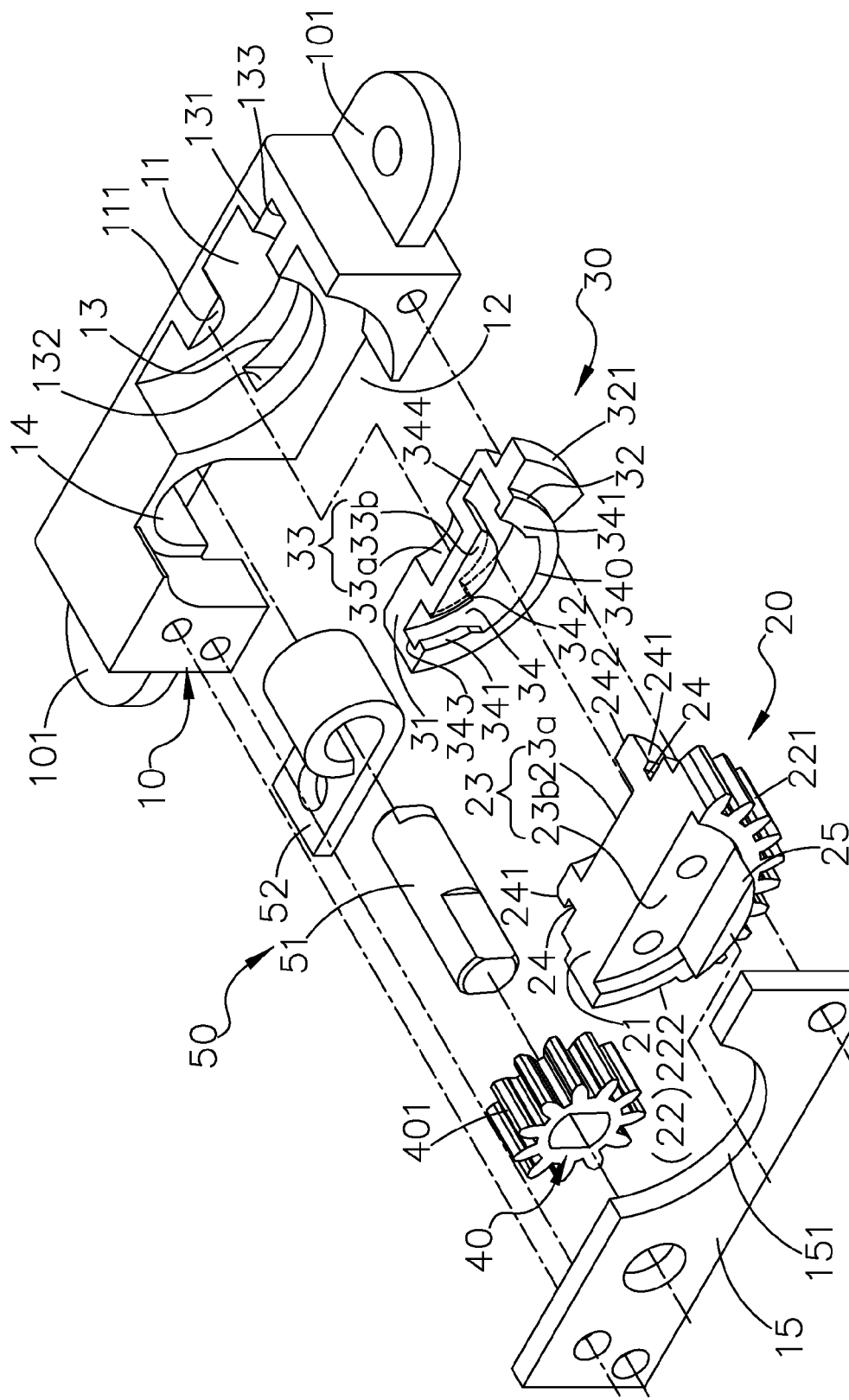
FIG. 9 is a schematic view of FIG. 8 taken from another angle.
Figure 10:
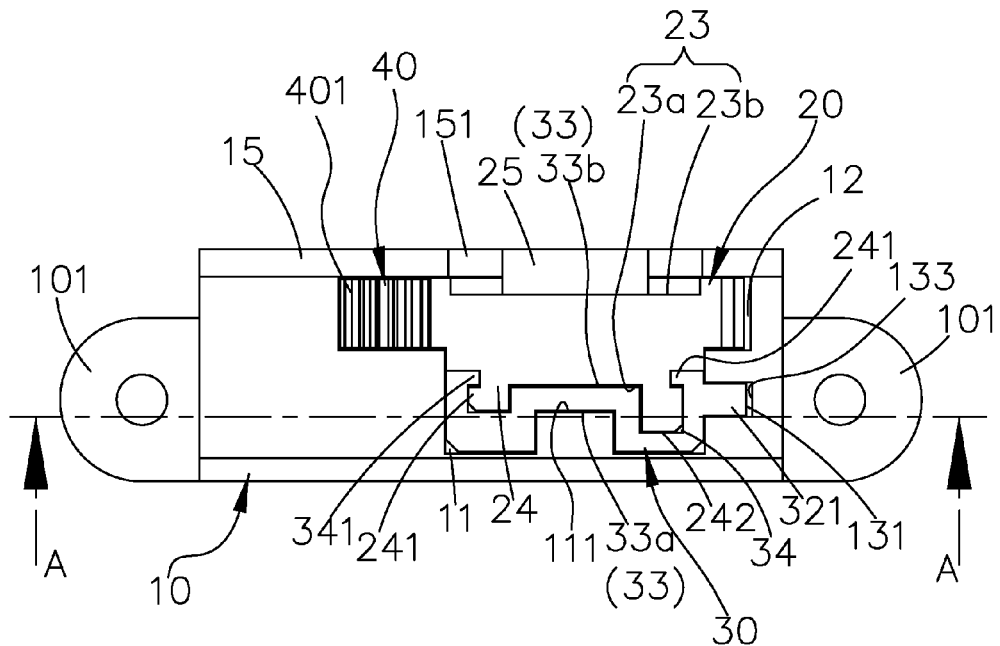
FIG. 10 is a top view of FIG. 8.

As shown in FIG. 4 and FIG. 5, the first rotation unit 20 is formed with a first planar surface 21 and a first arc-shaped surface 22 so as to form a radial lateral circumference of the first rotation unit 20, so the contour of the first rotation unit 20 can either be a bow-like member or a semi-circular member when being viewed in the axial direction, and the first arc-shaped surface 22 is formed with a plurality of teeth structures 221 arranged in sequence. The rotation mechanism is further installed with a third rotation unit 40 in the action space 12 of the base 10. The radial lateral circumference of the third rotation unit 40 is annularly formed with a plurality of teeth structures 401, so the third rotation unit 40 is able to be served as a gear structure for being mutually engaged with the plural teeth structures 221 of the first rotation unit 20, and the first rotation unit 20 in the rotating status is able to drive the third rotation unit 40 to synchronously and reversely rotate, so the first rotation unit 20 and the second rotation unit 30 in contact at the axial side are not only provided with a function of sequentially rotating in stages, but also provided with an effect of increasing the stability of rotating motion. As such, the first arc-shaped surface 22 of the first rotation unit 20 is able to fully enter the action space 12 of the base 10 and the first planar surface 21 is able to be aligned with one radial side of the base 10, thereby allowing the first rotation unit 20 to be hidden in the base 10. Wherein, for increasing the applicable range in actual practice, the action space 12 can be designed to be in a hollow status (as shown in FIG. 2 and FIG. 3), or designed to be an opened status and provided with a lateral plate 15 (as shown in FIG. 8 and FIG. 9), and the radial wall surface inside the action space is designed as an arc-shaped surface for facilitating the rotating motion of the first rotation unit and the third rotation unit.

Figure 6:
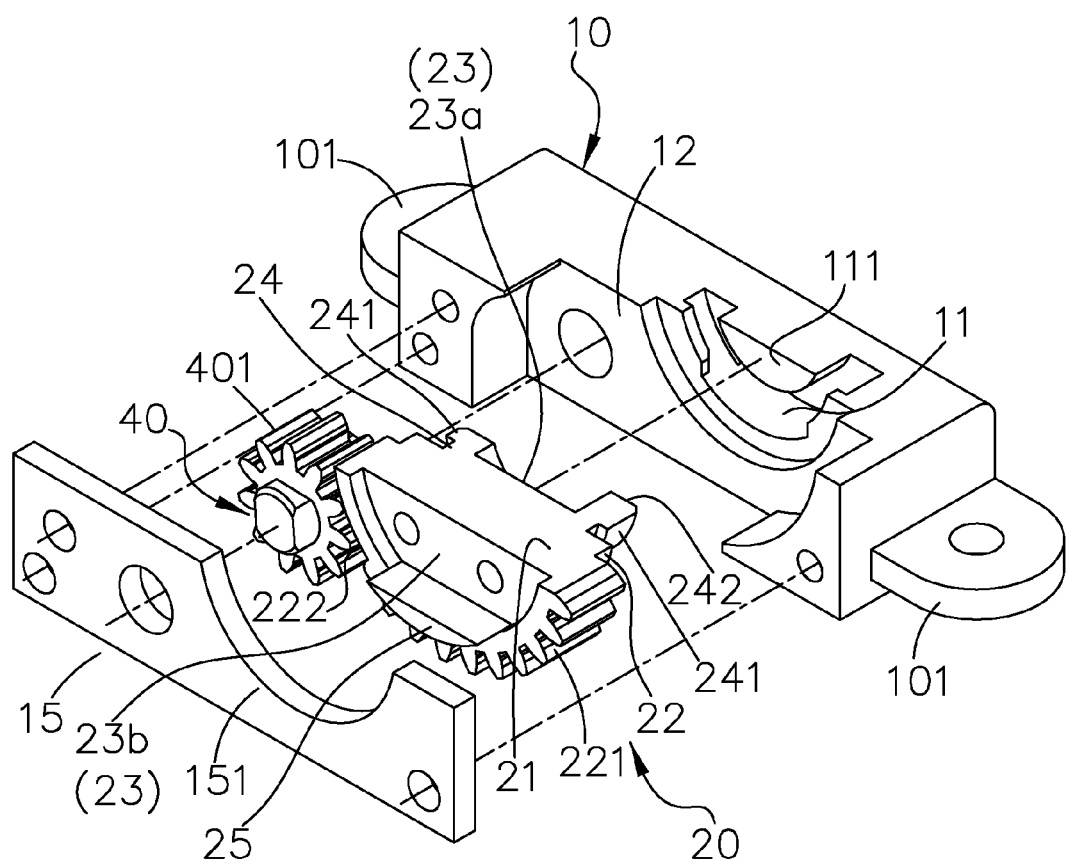
FIG. 6 is a schematic view illustrating the hinge device according to a second embodiment of the present invention.
Figure 7:
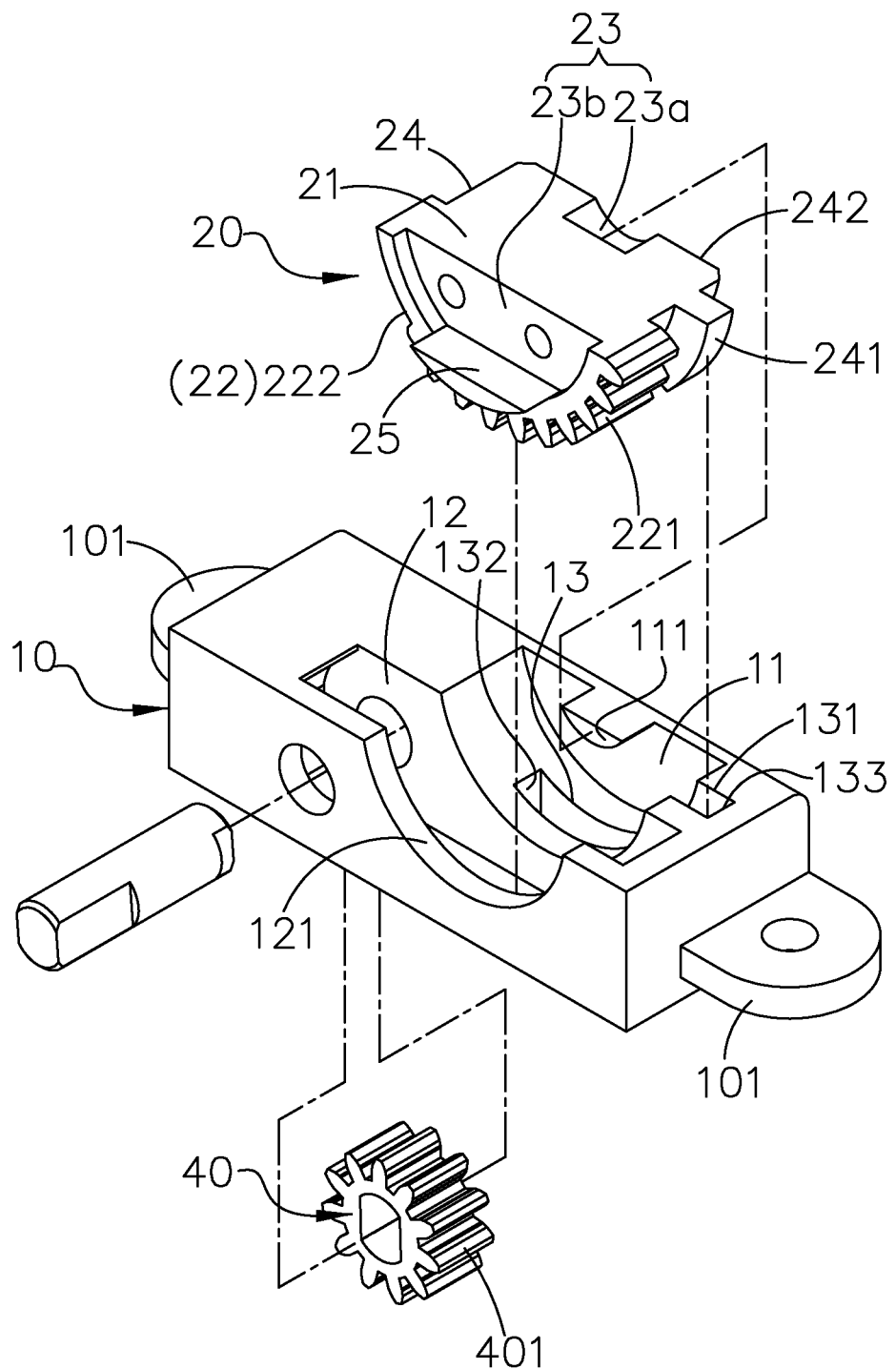
FIG. 7 is a perspective exploded view illustrating an alternative according to the second embodiment of the present invention.

As shown in FIG. 6 and FIG. 7, according to a second embodiment of the present invention, the hinge device includes a base 10 and a rotation mechanism, however in the rotation mechanism disclosed in the second embodiment, a third rotation unit 40 is adopted for replacing the above-mentioned second rotation unit 30, so the first rotation unit 20 is able to work with the third rotation unit 40. The difference between the first embodiment and the second embodiment is that: the two rotation units (the first rotation unit 20 and the second rotation unit 30) in contact at the axial side for sequentially rotating in stages are replaced by the two rotation units (the first rotation unit 20 and the third rotation unit 40) in contact at the radial lateral circumference for synchronously rotating, and the technical characteristic is that: one radial side of the base 10 is formed with an arc-shaped recess 11, an axial connection part 111 is formed in the arc-shaped recess 11, and one axial side of the arc-shaped recess 11 is formed with an action space 12. The rotation mechanism includes a first rotation unit 20 and a third rotation unit 40 which are in mutual contact and both disposed in the action space 12 and contact each other via the radial lateral circumference, one axial side of the first rotation unit 20 is formed with a first axial connection part 23 and an arc-shaped structure 24 surrounding the first axial connection part 23, the arc-shaped structure 24 is able to slide in or out of the arc-shaped recess 11. The first axial connection part 23 is engaged with the axial connection part 111, thereby enabling the first rotation unit 20 to slide along the action space 12 so as to be rotated in or out of the base 10, and a relative rotating status is formed between the first rotation unit 20 and the base 10, and the first rotation unit 20 in the rotating status is able to drive the third rotation unit 40 to synchronously and reversely rotate.

According to the second embodiment, the axial concave part 23a of the first rotation unit 20 is engaged with the axial convex part (the axial connection part 111) of the base 10, thereby enabling the first rotation unit 20 and the base 10 to relatively rotate, the engaging status between the two can be the arc-shaped recess 11 structure shown in FIG. 6 disclosed in the second embodiment, the second rotation unit disclosed in the first embodiment can be seen as being combined with the arc-shaped recess so as to be integrally formed with the base, and one axial side of the base 10 disclosed in the second embodiment is installed with a detachable lateral plate 15 (as shown in FIG. 6), and a pivotal connecting hole is respectively formed on the axial lateral wall surface of the action space 12 and the corresponding location of the lateral plate 15 for pivotally connecting the axial core of the third rotation unit 40; or the first rotation unit 20 disclosed in FIG. 7 of the second embodiment can be seen as combining the second rotation unit disclosed in the first embodiment and the first rotation unit as one piece so as to work with the base shown in FIG. 2 of the first embodiment, and the axial core of the third rotation unit 40 is formed as a detachable axial core structure for facilitating the assembly and disassembly. As such, in both of the alternatives disclosed in FIG. 6 and FIG. 7, the first axial connection part 23 (the axial concave part 23a) is able to be engaged with the axial connection part 111 (the axial convex part).

Based on what has been disclosed above, the first rotation unit 20 can also be formed with a first planar surface 21 and a first arc-shaped surface 22 so as to form a radial lateral circumference of the first rotation unit 20, so the contour of the first rotation unit 20 can either be a bow-like member or a semi-circular member when being viewed in the axial direction. For stabling the rotating motion, the rotation mechanism can be installed with additional components or structures, for example the first arc-shaped surface 22 is formed with a plurality of teeth structures 221 arranged in sequence, the radial lateral circumference of the third rotation unit 40 is annularly formed with a plurality of teeth structures 401, so the third rotation unit 40 is able to be served as a gear structure for being mutually engaged with the plural teeth structures 221 of the first rotation unit 20.

Figure 14:
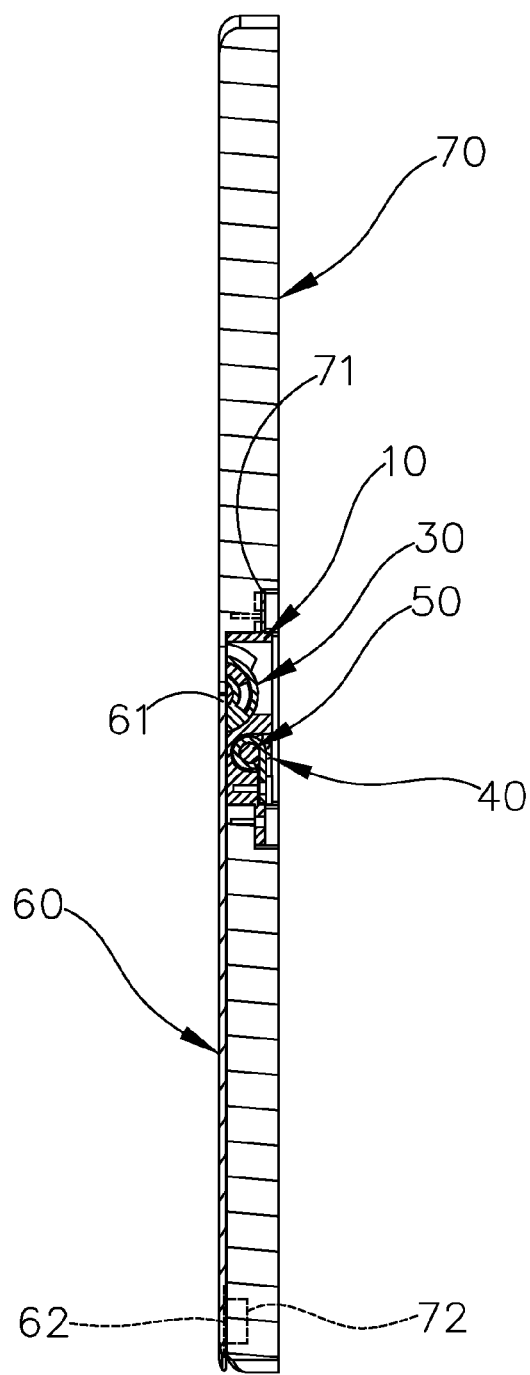
FIG. 14 is a cross sectional view illustrating the hinge device being fastened on a corresponding connection part of a machine body and connected to a corresponding connection part of a supporter.
Figure 15:
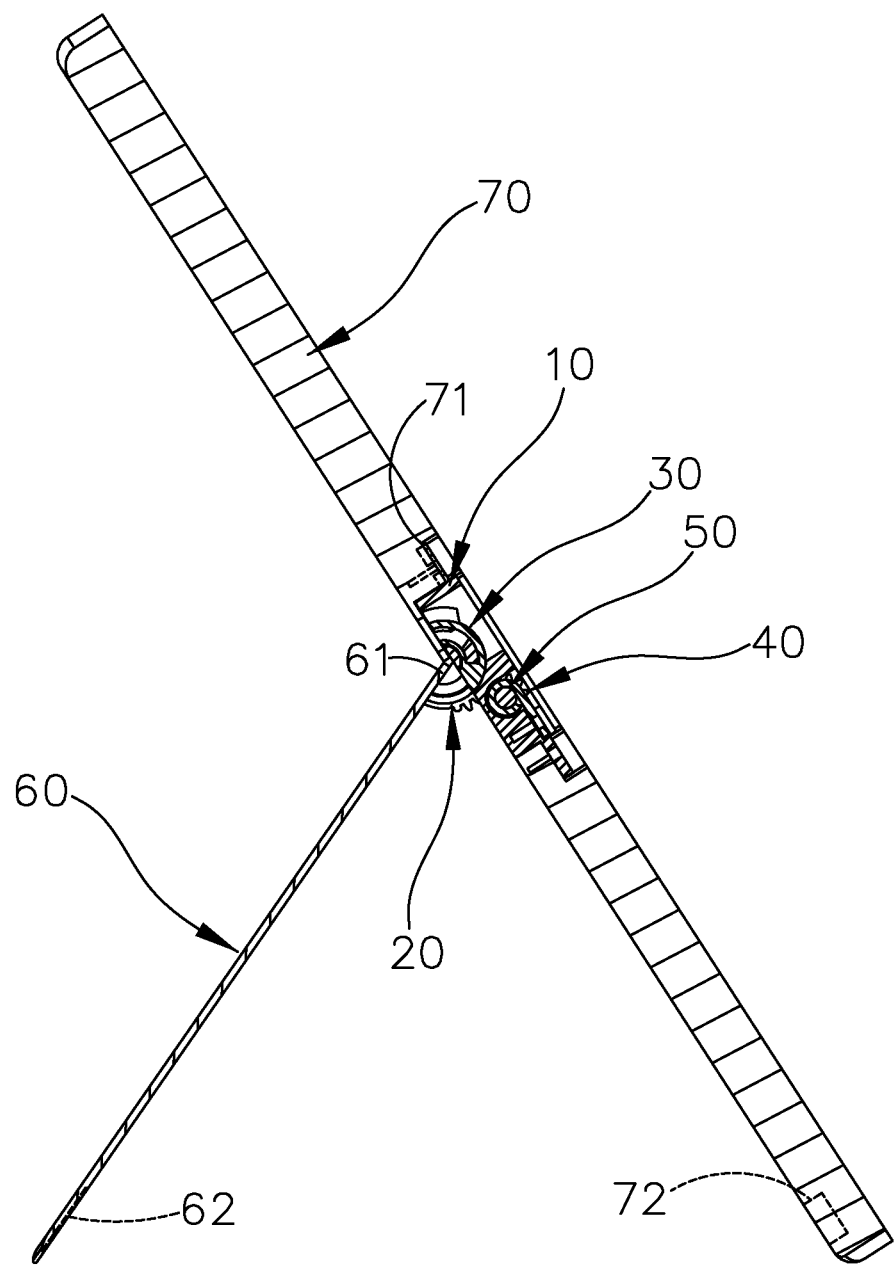
FIG. 15 is a schematic view illustrating the operational status after the operation shown in FIG. 14.
Figure 16:
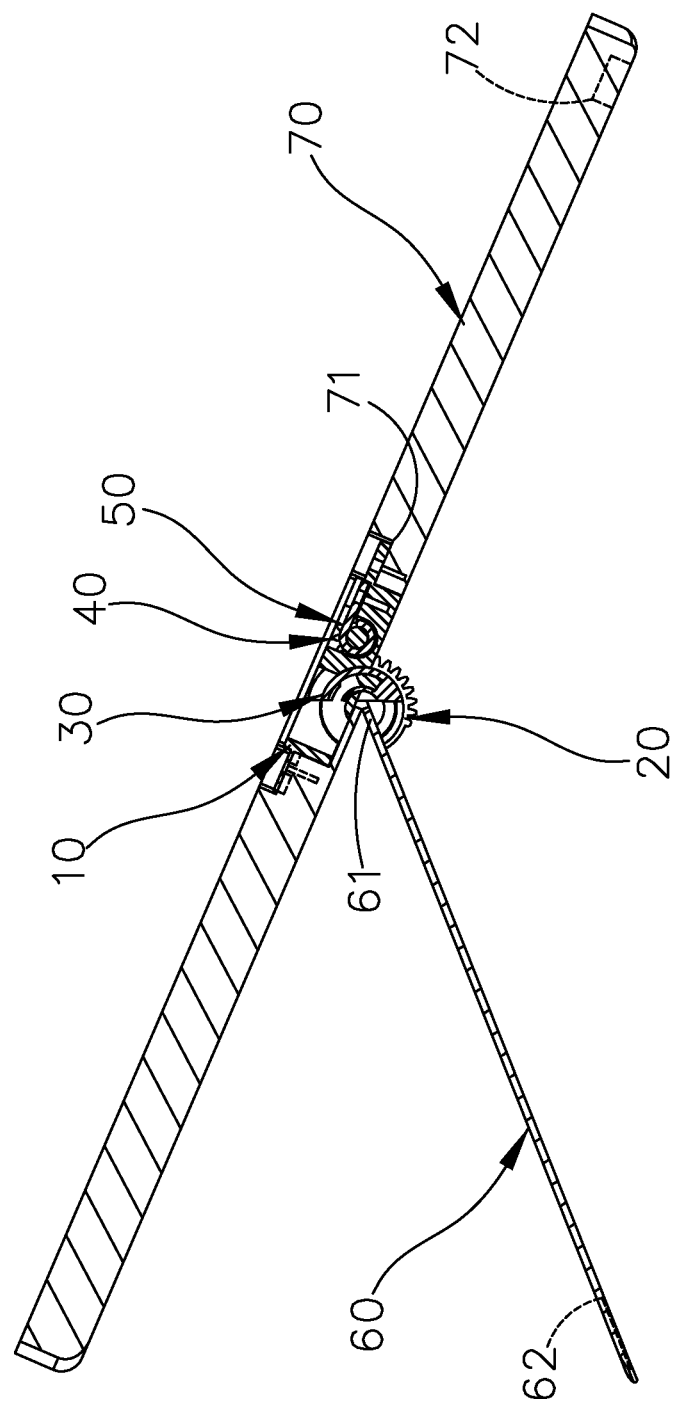
FIG. 16 is a schematic view illustrating the operational status after the operation shown in FIG. 15.
Figure 17:
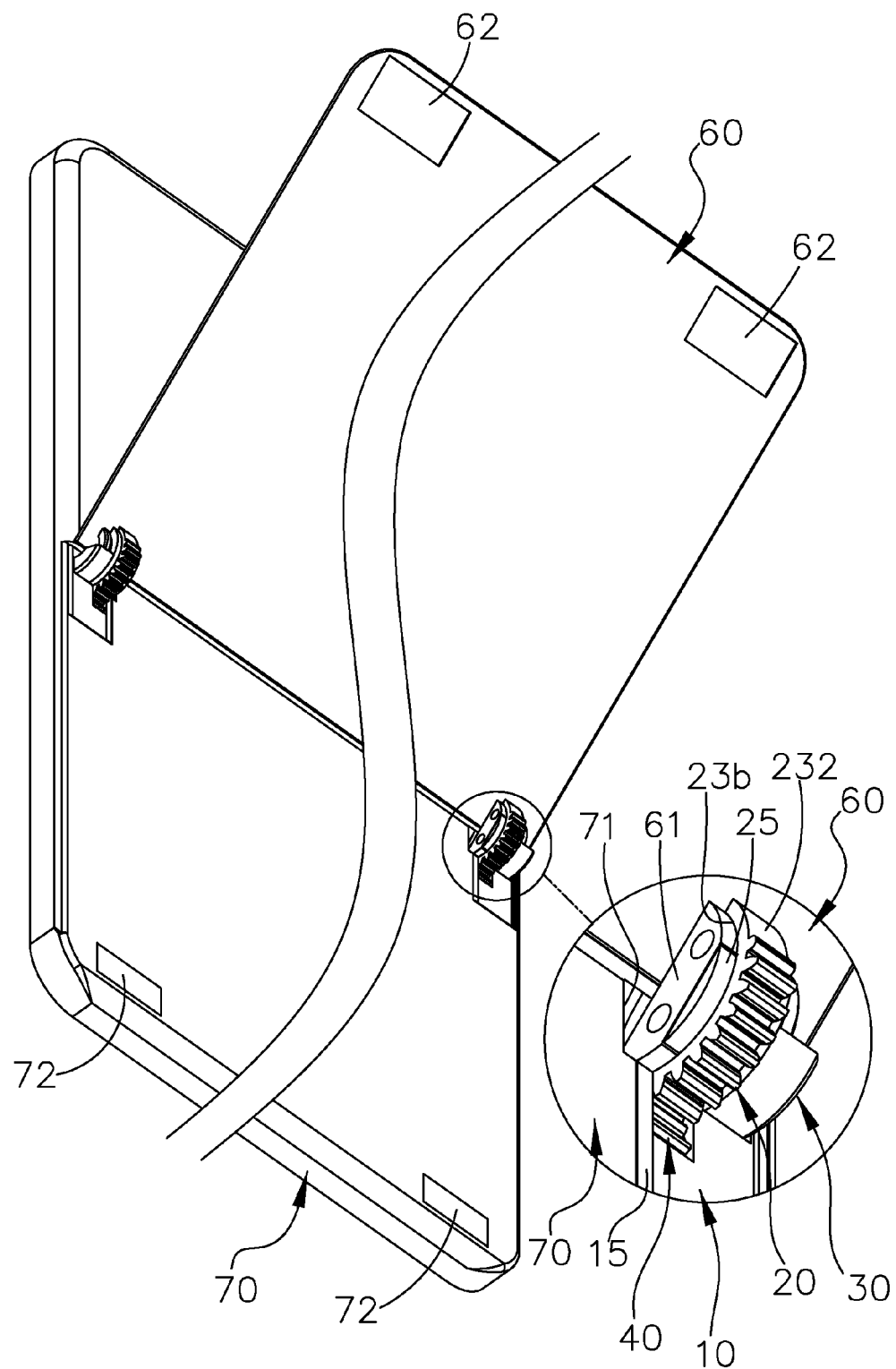
FIG. 17 is a perspective view of FIG. 16, wherein a schematic enlarged view illustrating the hinge device being respectively assembled with the machine body and the supporter also being provided.

In addition, according to FIG. 5 disclosed in the first embodiment and the FIG. 7 disclosed in the second embodiment, the first arc-shaped surface 22 is further formed with a non-teeth area 222 adjacent to the plural teeth structures 221, the non-teeth area 222 is not in contact with the teeth structures 401 of the third rotation unit 40, so an intermittent synchronous rotating status can be formed between the third rotation unit 40 and the first rotation unit 20. After the hinge device of the present invention is respectively connected to a machine body 70 and a supporter 60, when the supporter 60 and the machine body 70 are folded, the non-teeth area 222 of the first rotation unit 20 is corresponding to the teeth structures 401 of the third rotation unit 40 thereby being unable to be engaged, so a mutual linking or restraining effect is unable to be achieved, thus a user can easily unfold the supporter 60; on the other hand, when the unfolded supporter 60 utilizes a free end thereof to approach the machine body 70, a magnetic member 62 of the supporter 60 and a magnetic member 72 of the machine body 70 are mutually attracted for achieving an auto folding effect (as shown in FIG. 14).

According to the two above-mentioned embodiments and referring to FIG. 8 and FIG. 9, when the action space 12 of the base 10 is in an opened status, the base 10 is further installed with a lateral plate 15 at one axial side of the action space 12. The lateral plate 15 is formed with a notch 151 in a circular-like status and corresponding to the opposite axial side of the first rotation unit 20, so the notch 151 is formed as an arc-shaped inner edge on the lateral plate 15, and extended with an axial convex part 25 at the opposite axial side of the first rotation unit 20 and penetrating the notch 151, so the first rotation unit 20 in the rotating status is able to utilize the axial convex part 25 to be in contact with and moved along the arc-shaped inner edge of the notch 151. According to the second embodiment, a second rotation unit 30 disposed in the arc-shaped recess 11 can be further installed between the first rotation unit 20 and the base 10. Referring from FIG. 8 to FIG. 13, the second rotation unit 30 is formed with a second axial connection part 33 and an arc-shaped channel 34 surrounding the second axial connection part 33 and engaged with the arc-shaped structure 24, so the arc-shaped structure 24 is able to slide in or out of the arc-shaped channel 34, and two axial ends of the second axial connection part 33 are respectively connected to the axial connection part 111 and the first axial connection part 23, thereby enabling the first rotation unit 20 and the second rotation unit 30 to respectively slide along the action space 12 and the arc-shaped recess 11 so as to be respectively rotated in or out of the base 10, and a relative rotating status is formed between the first rotation unit 20, the second rotation unit 30 and the base 10. According to the second embodiment, the axial convex part (the axial connection part 111) of the base 10 is able to be engaged with the axial concave part 33a (the second axial connection part 33) at the opposite axial side of the second rotation unit 30, or able to be engaged with the axial concave part 23a (the first axial connection part 23) at one axial side of the first rotation unit 20. As for each axial connection part being designed as the axial convex parts 111, 33b or the axial concave parts 23a, 23b, 33a, the technical features of the arc-shaped opening 340 and the channel openings 343, 344 of the arc-shaped channel 34, the technical features of the radial block wall 341 of the arc-shaped opening 340 working with the radial flange 241 of the arc-shaped structure 24, the technical features of the stop structure 342 of the arc-shaped channel 34 working with the corresponding stop structure 242 of the arc-shaped structure 24, the technical features of the radial penetrated hole 13 and the notch 131 of the base 10 working with the fan-shaped stop block 321 of the second rotation unit 30, and the technical features of the second planar surface 31 and the second arc-shaped surface 32 of the second rotation unit 30 have all been disclosed in the first embodiment, therefor no further illustration is provided.

According to the two above-mentioned embodiments and referring to FIG. 8 and FIG. 9, the opposite radial side of the base 10 is further formed with a positioning recess 14, and the rotation mechanism is further installed with a torque unit 50 at the axial side of the third rotation unit 40. The torque unit 50 is received in the positioning recess 14 and served to work with the third rotation unit 40 in the rotating status for generating a torque varying effect. The positioning recess 14 is divided into a deep groove 141 communicated with the action space 12 and a shallow groove 142 communicated with the deep groove 141. The torque unit 50 includes a core shaft 51 connected and inserted in the axial core of the third rotation unit 40 (the axial core of the third rotation unit 40 and the core shaft 51 can be formed as an integral structure or formed as a detachable structure), and a sleeve member 52 sleeved with the core shaft 51; the sleeve member 52 can be configured by one or more than one of a enclosing member having an opening, a plurality of elastic pads working with adjustment screws, a torsion spring, a cylinder sleeve or a plurality of friction pads mutually stacked; according to the present invention, a enclosing member is adopted as the sleeve member 52, the enclosing member is installed with a enclosing part 531 having a radial opening 532 and a connection plate 533. The connection plate 533 is received and fastened in the shallow groove 142, and the enclosing part 531 is socketingly disposed onto one end portion of the core shaft 51 and received in the deep groove 141.

According to the two above-mentioned embodiments and referring from FIG. 14 to FIG. 17, another two opposite radial sides of the base 10 are respectively formed with a lateral connection part 101, thereby enabling the base 10 to be fastened in a corresponding connection part 71 of the machine body 70, and the opposite axial side of the first rotation unit 20 is further formed with an axial concave part 23b for being connected to a corresponding connection part 61 of the supporter 60, when the corresponding connection part 61 and the axial concave part 23b are mutually connected, the axial convex part 25 and the corresponding connection part 61 are abutted against each other, so the supporter 60 is able to drive the first rotation unit 20 for synchronous movement. The machine body 70 and the supporter 60 are respectively installed with at least one magnetic member 72, 62, so the supporter 60 and the machine body 70 which are close to each other or already been folded allow each of the at least one magnetic member 62, 72 to be mutually attracted, thereby providing a stable folding effect to the machine body 70 and the supporter 60.

According to the above-mentioned embodiments, screws and screw holes (not shown in figures) are adopted for fastening the disclosed components, for example: the fastening means for the lateral plate 15 and the base 10, the fastening means for the base 10 and the machine body 70 and the fastening means for the first rotation unit 20 and the supporter 60 are the conventional fastening means, therefore no further illustration is provided.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A hinge device, including:
a base, one radial side thereof being formed with an arc-shaped recess, an axial connection part being formed in said arc-shaped recess, and one axial side of said arc-shaped recess being formed with an action space; and
a rotation mechanism, including a first rotation unit and a second rotation unit being in contact with each other and respectively disposed in said action space and said arc-shaped recess, one axial side of said first rotation unit being formed with a first axial connection part and an arc-shaped structure surrounding said first axial connection part, one axial side of said second rotation unit being formed with a second axial connection part and an arc-shaped channel surrounding said second axial connection part and engaged with said arc-shaped structure, said arc-shaped structure being able to slide in or out of said arc-shaped channel, and two axial ends of said second axial connection part being respectively connected to said axial connection part and said first axial connection part, thereby enabling said first rotation unit and said second rotation unit to respectively slide along said action space and said arc-shaped recess so as to be respectively rotated in or out of said base, and a relative rotating status being formed between said first rotation unit, said second rotation unit and said base;
wherein said first rotation unit is formed with a first planar surface and a first arc-shaped surface so as to form a radial lateral circumference of said first rotation unit, and said first arc-shaped surface is formed with a plurality of teeth structures arranged in sequence; said rotation mechanism is further installed with a third rotation unit in said action space of said base, a radial lateral circumference of said third rotation unit is annularly formed with a plurality of teeth structures for being mutually engaged with said plural teeth structures of said first rotation unit, thereby enabling said first rotation unit in the rotating status to drive said third rotation unit to synchronously and reversely rotate; said first arc-shaped surface of said first rotation unit being able to fully enter said action space of said base for allowing said first planar surface to be aligned with one radial side of said base.

2. A hinge device, including:
a base, one radial side thereof being formed with an arc-shaped recess, an axial connection part being formed in said arc-shaped recess, and one axial side of said arc-shaped recess being formed with an action space; and
a rotation mechanism, including a first rotation unit and a third rotation unit being in mutual contact and both disposed in said action space and contacting each other via a radial lateral circumference, one axial side of said first rotation unit being formed with a first axial connection part and an arc-shaped structure surrounding said first axial connection part, said arc-shaped structure being able to slide in or out of said arc-shaped recess, and said first axial connection part being engaged with said axial connection part, thereby enabling said first rotation unit to slide along said action space so as to be rotated in or out of said base, and a relative rotating status being formed between said first rotation unit and said base, and said first rotation unit in the rotating status being able to drive said third rotation unit to synchronously and reversely rotate;
wherein said first rotation unit is formed with a first planar surface and a first arc-shaped surface so as to form a radial lateral circumference of said first rotation unit, and said first arc-shaped surface is formed with a plurality of teeth structures arranged in sequence; a radial lateral circumference of said third rotation unit is annularly formed with a plurality of teeth structures for being mutually engaged with said plural teeth structures of said first rotation unit; said first arc-shaped surface of said first rotation unit is able to fully enter said action space of said base for allowing said first planar surface to be aligned with one radial side of said base.

3. The hinge device as claimed in claim 1, wherein the opposite radial side of said base is further formed with a positioning recess, said rotation mechanism is further installed with a torque unit at one axial side of said third rotation unit, and said torque unit is received in said positioning recess and served to work with said third rotation unit in the rotating status for generating a torque varying effect.

4. The hinge device as claimed in claim 2, wherein the opposite radial side of said base is further formed with a positioning recess, said rotation mechanism is further installed with a torque unit at one axial side of said third rotation unit, and said torque unit is received in said positioning recess and served to work with said third rotation unit in the rotating status for generating a torque varying effect.

5. The hinge device as claimed in claim 3, wherein said positioning recess is divided into a deep groove communicated with said action space and a shallow groove communicated with said deep groove, and said torque unit includes a core shaft connected and inserted in an axial core of said third rotation unit, and a sleeve member sleeved with said core shaft, wherein said sleeve member is a enclosing member, said enclosing member is installed with a enclosing part having a radial opening and a connection plate, said connection plate is received and fastened in said shallow groove, and said enclosing part is socketingly disposed onto one end portion of said core shaft and received in said deep groove.

6. The hinge device as claimed in claim 4, wherein said positioning recess is divided into a deep groove communicated with said action space and a shallow groove communicated with said deep groove, and said torque unit includes a core shaft connected and inserted in an axial core of said third rotation unit, and a sleeve member sleeved with said core shaft, wherein said sleeve member is a enclosing member, said enclosing member is installed with a enclosing part having a radial opening and a connection plate, said connection plate is received and fastened in said shallow groove, and said enclosing part is socketingly disposed onto one end portion of said core shaft and received in said deep groove.

7. The hinge device as claimed in claim 1, wherein said first arc-shaped surface is further formed with a non-teeth area adjacent to said plural teeth structures, said non-teeth area is not in contact with said teeth structures of said third rotation unit, so an intermittent synchronous rotating status is formed between said third rotation unit and said first rotation unit.

8. The hinge device as claimed in claim 2, wherein said first arc-shaped surface is further formed with a non-teeth area adjacent to said plural teeth structures, said non-teeth area is not in contact with said teeth structures of said third rotation unit, so an intermittent synchronous rotating status is formed between said third rotation unit and said first rotation unit.

9. The hinge device as claimed in claim 2, wherein a second rotation unit disposed in said arc-shaped recess is further installed between said first rotation unit and said base, said second rotation unit is formed with a second axial connection part and an arc-shaped channel surrounding said second axial connection part and engaged with said arc-shaped structure, so said arc-shaped structure is able to slide in or out of said arc-shaped channel, and two axial ends of said second axial connection part are respectively connected to said axial connection part and said first axial connection part, thereby enabling said first rotation unit and said second rotation unit to respectively slide along said action space and said arc-shaped recess so as to be respectively rotated in or out of said base, and a relative rotating status is formed between said first rotation unit, said second rotation unit and said base.

10. The hinge device as claimed in claim 1, wherein said axial connection part of said base is formed with an axial convex part in said arc-shaped recess, said first axial connection part is respectively formed with an axial concave part at two opposite axial sides of said first rotation unit; said second axial connection part is respectively formed with an axial concave part and an axial convex part at two opposite axial sides of said second rotation unit, so said axial convex part at one axial side of said second rotation unit is able to be engaged with said axial concave part at one axial side of said first rotation unit, and said axial convex part of said base is able to be engaged with said axial concave part at the opposite axial side of said second rotation unit or engaged with said axial concave part at one axial side of said first rotation unit.

11. The hinge device as claimed in claim 9, wherein said axial connection part of said base is formed with an axial convex part in said arc-shaped recess, said first axial connection part is respectively formed with an axial concave part at two opposite axial sides of said first rotation unit; said second axial connection part is respectively formed with an axial concave part and an axial convex part at two opposite axial sides of said second rotation unit, so said axial convex part at one axial side of said second rotation unit is able to be engaged with said axial concave part at one axial side of said first rotation unit, and said axial convex part of said base is able to be engaged with said axial concave part at the opposite axial side of said second rotation unit or engaged with said axial concave part at one axial side of said first rotation unit.

12. The hinge device as claimed in claim 1, wherein said arc-shaped channel is concavely formed at one axial side of said second rotation unit, and an arc-shaped opening is formed at said axial side, and one radial side of said second rotation unit is formed with at least one channel opening, and said arc-shaped structure is protrudingly formed at one axial side of said first rotation unit and corresponding to the shape of said arc-shaped channel, said first rotation unit and said second rotation unit are in corresponding contact at said axial side, and said arc-shaped structure is able to be correspondingly engaged with said arc-shaped channel and able to enter or leave through said at least one channel opening.

13. The hinge device as claimed in claim 9, wherein said arc-shaped channel is concavely formed at one axial side of said second rotation unit, and an arc-shaped opening is formed at said axial side, and one radial side of said second rotation unit is formed with at least one channel opening, and said arc-shaped structure is protrudingly formed at one axial side of said first rotation unit and corresponding to the shape of said arc-shaped channel, said first rotation unit and said second rotation unit are in corresponding contact at said axial side, and said arc-shaped structure is able to be correspondingly engaged with said arc-shaped channel and able to enter or leave through said at least one channel opening.

14. The hinge device as claimed in claim 12, wherein an edge of said arc-shaped opening is formed with at least one radial block wall, and at least one radial flange is formed along an edge of said arc-shaped structure, so said arc-shaped structure and said arc-shaped channel are enabled to be m utually buckled.

15. The hinge device as claimed in claim 12, wherein one end of said arc-shaped channel is gradually shrunk towards the other end thereby forming a stop structure on an inner wall of said arc-shaped channel, and an outer wall of said arc-shaped structure is formed with a corresponding stop structure, said corresponding stop structure is able to slide in said arc-shaped channel and stopped by said stop structure, so said first rotation unit or said second rotation unit whichever is firstly rotated out is able to be formed with a lager angle relative to said base comparing said second rotation unit or said first rotation unit which is subsequently rotated out.

16. The hinge device as claimed in claim 1, wherein said base is further formed with a radial penetrated hole, said radial penetrated hole penetrates said arc-shaped recess and is formed with a notch at an edge of said arc-shaped recess; said second rotation unit is formed with a second planar surface and a second arc-shaped surface so as to form a radial lateral circumference of said second rotation unit; a fan-shaped stop block is extended from said radial lateral circumference and capable of sliding in said radial penetrated hole, said fan-shaped stop block is moved with said second rotation unit in the rotating status so as to be in contact with one radial hole wall of said radial penetrated hole for forming a stopping status, or to enter or leave said radial penetrated hole via said notch; said second arc-shaped surface of said second rotation unit is able to fully enter said arc-shaped recess of said base thereby allowing said second planar surface to be aligned with one radial side of said base.

17. The hinge device as claimed in claim 9, wherein said base is further formed with a radial penetrated hole, said radial penetrated hole penetrates said arc-shaped recess and is formed with a notch at an edge of said arc-shaped recess; said second rotation unit is formed with a second planar surface and a second arc-shaped surface so as to form a radial lateral circumference of said second rotation unit; a fan-shaped stop block is extended from said radial lateral circumference and capable of sliding in said radial penetrated hole, said fan-shaped stop block is moved with said second rotation unit in the rotating status so as to be in contact with one radial hole wall of said radial penetrated hole for forming a stopping status, or to enter or leave said radial penetrated hole via said notch; said second arc-shaped surface of said second rotation unit is able to fully enter said arc-shaped recess of said base thereby allowing said second planar surface to be aligned with one radial side of said base.

18. The hinge device as claimed in claim 1, wherein said action space is formed in an opened status, said base is further formed with a lateral plate at one axial side of said action space, said lateral plate is formed with a notch in a circular status and corresponding to the opposite axial side of said first rotation unit, and an axial convex part penetrating said notch is formed at the opposite axial side of said first rotation unit.

19. The hinge device as claimed in claim 2, wherein said action space is formed in an opened status, said base is further formed with a lateral plate at one axial side of said action space, said lateral plate is formed with a notch in a circular status and corresponding to the opposite axial side of said first rotation unit, and an axial convex part penetrating said notch is formed at the opposite axial side of said first rotation unit.

20. The hinge device as claimed in claim 1, wherein another two opposite radial sides of said base are respectively formed with a lateral connection part, thereby enabling said base to be fastened in a corresponding connection part of a machine body, and the opposite axial side of said first rotation unit is further formed with an axial concave part for being connected to a corresponding connection part of a supporter; said machine body and said supporter are respectively installed with at least one magnetic member, so said supporter and said machine body which are close to each other or already been folded allow each of said at least one magnetic member to be mutually attracted.

21. The hinge device as claimed in claim 2, wherein another two opposite radial sides of said base are respectively formed with a lateral connection part, thereby enabling said base to be fastened in a corresponding connection part of a machine body, and the opposite axial side of said first rotation unit is further formed with an axial concave part for being connected to a corresponding connection part of a supporter; said machine body and said supporter are respectively installed with at least one magnetic member, so said supporter and said machine body which are close to each other or already been folded allow each of said at least one magnetic member to be mutually attracted.

* * * * *